United States Patent [19]
Kasai

[11] Patent Number: 5,428,824
[45] Date of Patent: Jun. 27, 1995

[54] RADIO TRANSCEIVER CAPABLE OF AVOIDING INTERMODULATION DISTORTION

[75] Inventor: Yoshihiko Kasai, Tokyo, Japan
[73] Assignee: NEC Corporation, Tokyo, Japan
[21] Appl. No.: 856,808
[22] Filed: Mar. 24, 1992

Related U.S. Application Data

[63] Continuation of Ser. No. 393,734, Aug. 15, 1989, abandoned.

[30] Foreign Application Priority Data

Aug. 15, 1988 [JP] Japan ............... 63-202019

[51] Int. Cl.$^6$ .................................. H04B 1/40
[52] U.S. Cl. ................. 455/78; 455/183.1; 455/200.1; 455/246.1; 455/311
[58] Field of Search .......... 455/78, 83, 89, 183.1, 455/183.2, 200.1, 226.2, 226.3, 232.1, 295, 296, 310, 311, 341

[56] References Cited

U.S. PATENT DOCUMENTS

| | | | |
|---|---|---|---|
| 3,428,900 | 2/1969 | Newton | 455/209 |
| 3,729,681 | 4/1973 | Elder | 455/218 |
| 4,052,673 | 10/1977 | Herzog | 455/120 |
| 4,355,414 | 10/1982 | Inoue | 455/295 |
| 4,654,884 | 3/1987 | Sakai et al. | 455/295 |
| 4,955,077 | 9/1990 | Sugayama | 455/296 |

FOREIGN PATENT DOCUMENTS 1374435  2/1988  U.S.S.R. .

Primary Examiner—Edward F. Urban
Attorney, Agent, or Firm—Sughrue, Mion, Zinn, Macpeak & Seas

[57] ABSTRACT

A radio transceiver comprises an RF amplifier and a first frequency mixer which converts an amplified RF signal into a first IF signal and whose output may include intermodulation distortion. A second frequency mixer converts the output of first frequency mixer into a second IF signal. An interference detector detects the intermodulation distortion by seeing if a beat is included in the second IF signal. Upon detection of intermodulation distortion, a controller minimizes a gain of RF amplifier to decrease or eliminate the intermodulation distortion. Responsive to the end of conversation, the controller maximizes the gain of RF amplifier to increase the reception sensitivity. The controller may periodically maximize the RF amplifier gain after the detection of the intermodulation distortion. If no intermodulation distortion is detected during this gain-maximized period, the controller keeps the gain to be a maximized value. If the intermodulation distortion is not decreased or eliminated even though the RF amplifier gain is minimized, the controller may change a used frequency to another frequency.

12 Claims, 2 Drawing Sheets

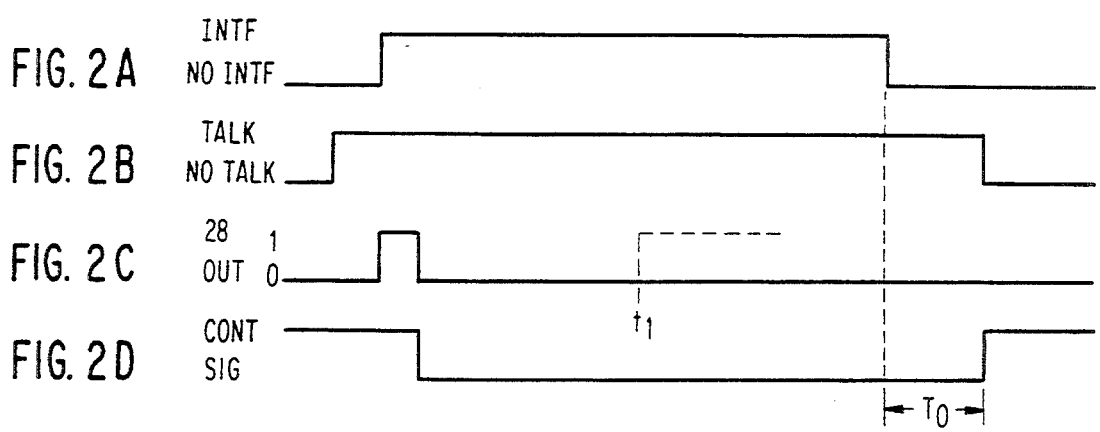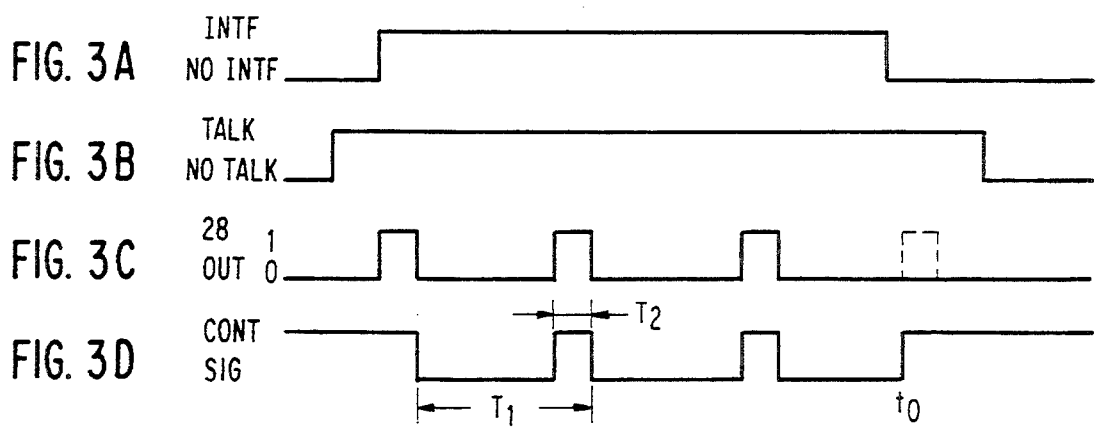

mized, the controller may change the frequency then being used to another frequency.

RADIO TRANSCEIVER CAPABLE OF AVOIDING INTERMODULATION DISTORTION

This is a Continuation of Application Ser. No. 07/393,734, filed Aug. 15, 1989, now abandoned.

BACKGROUND OF THE INVENTION

The present invention relates to a radio transceiver and, more particularly, to a radio transceiver for use in a mobile radio communications system.

In a mobile radio communications system, such as a cellular telephone system, the number of frequencies assigned to a base station has been increasing to ease a strong demand. In addition, a single frequency is reused in a certain small area for effective use of the frequencies. Thus, a receiver used in, for example, a mobile station may receive more than one frequency.

The received signal is first applied to a radio frequency (RF) amplifier followed by a frequency converter, or mixer. The RF amplifier is set to have a high gain in order to increase the reception sensitivity. As a result, the mixer produces undesired sums and differences of the received two or more frequencies due to its non-linearity and overloading. The undesired sum and difference frequencies are commonly referred to as intermodulation distortion which deteriorates the speech quality of telephone communication.

SUMMARY OF THE INVENTION

An object of the present invention is, therefore, to provide a generally improved radio transceiver which eliminates the above-mentioned deficiencies.

Another object of the present invention is to provide a radio transceiver capable of avoiding or easing intermodulation distortion.

Yet another object of the present invention is to provide a radio transceiver which avoids the speech quality deterioration due to intermodulation distortion and keeps high reception sensitivity in case of no intermodulation distortion.

Still yet another object of the present invention is to provide a radio transceiver which eliminates intermodulation distortion by changing a frequency used to another frequency when the used frequency is severely interfered with by other frequencies.

According to the present invention, there is provided a radio transceiver comprising a radio frequency (RF) amplifier and a first frequency mixer which converts an RF signal into a first intermediate frequency (IF) signal and whose output may include intermodulation distortion. A second frequency mixer converts the first IF signal into a second IF signal. An interference detector detects the intermodulation distortion by seeing if a beat is included in the second IF signal. Upon the detection of intermodulation distortion, a controller minimizes a gain of the RF amplifier to decrease or eliminate the intermodulation distortion. Responsive to the end of communication, the controller maximizes the RF amplifier gain to increase the reception sensitivity.

The controller may periodically maximize the RF amplifier gain after the detection of intermodulation distortion. If no intermodulation distortion is detected during this gain maximized period, the controller keeps the gain at the maximized value.

If the intermodulation distortion is not decreased or eliminated even though the RF amplifier gain is minimized, the controller may change the frequency then being used to another frequency.

BRIEF DESCRIPTION OF THE DRAWINGS

The above and other object, features and advantages of the present invention will become more apparent from the following description referring to the accompanying drawings, in which:

FIGS. 2A to 2D show an operation of the transceiver shown in FIG. 1; and

FIGS. 3A to 3D show another operation of the transceiver shown in FIG. 1.

DETAILED DESCRIPTION OF THE PREFERRED EMBODIMENT

Figure 1:
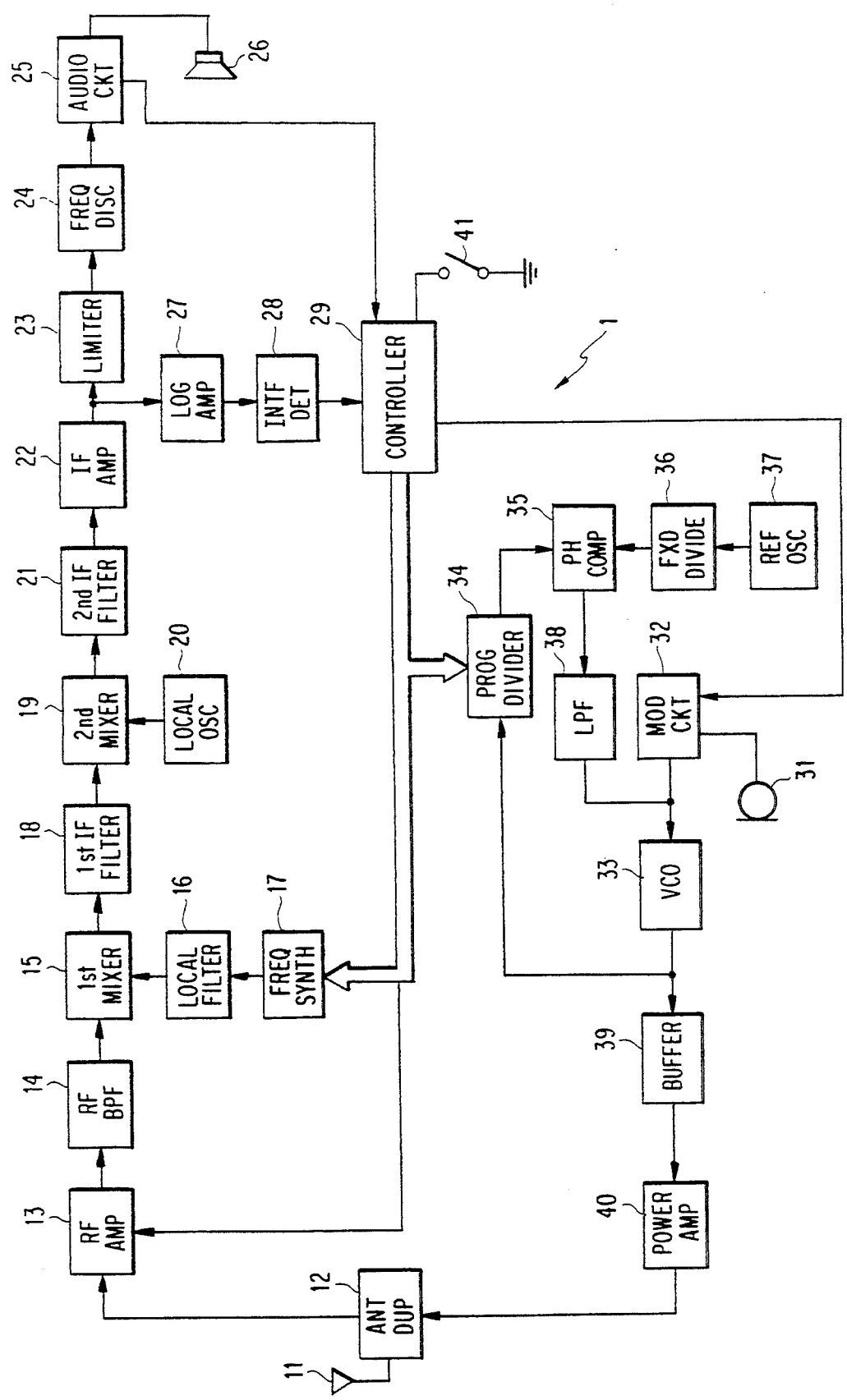
FIG. 1 is a block diagram showing a radio transceiver embodying the present invention.

In FIG. 1, a radio transceiver 1 may be used in mobile radio communications systems, such as a cellular telephone system which includes a plurality of mobile stations and a plurality of base stations connected to a public telephone network. The particular transceiver 1 is included in one of the mobile stations.

An antenna 11 picks up a radio frequency (RF) signal and supplies it to an RF amplifier 13 through an antenna duplexer 12. The gain of RF amplifier 13 is changeable in accordance with a gain control signal from a controller 29. RF amplifier 13 supplies an amplified RF signal to an RF band-pass filter 14 which eliminates from the RF signal unnecessary components but cannot eliminate unnecessary components falling within the filter pass band. The output of filter 14 is supplied to a first frequency converter, or mixer 15.

The mixer 15 also receives a first local oscillation signal, through a local filter 16, from a frequency synthesizer 17 whose output frequency is changed in accordance with a channel control signal from the controller 29. The mixer 15 mixes the two applied signals, which are at different frequencies, to convert the RF signal into a first intermediate frequency (IF) signal. The first IF signal is supplied through a first IF filter 18 to a second mixer 19 which also receives a second local oscillation signal from a fixed local oscillator 20.

The mixer 19 mixes the frequencies of the first IF signal and of the second local oscillation signal to produce a second IF signal. The second IF signal is supplied to an IF amplifier 22 through a second IF filter 21.

The IF amplifier 22 amplifies the input thereto and supplies the amplified IF signal to a frequency discriminator 24 for frequency demodulation, through a limiter 23 which limits the amplitude of IF signal to a certain level. The discriminator 24 frequency discriminates the IF signal to produce a baseband signal and provides it to an audio frequency (AF) circuit 25. The AF circuit 25 provides an audio signal to a speaker 26 and also provides control data to the controller 29.

An audio signal to be transmitted is applied to a modulation generator 32 through a microphone 31. Control data is also applied from the controller 29 to the modulation generator 32. The generator 32 generates a modulation signal representative of the input audio signal and/or the control data. The modulation signal is supplied to a voltage-controlled oscillator (VCO) 33 together with an output of a low-pass filter 38. Thus, the modulation signal is modulated on a transmission signal generated by VCO 33.

The output of VCO 33 is supplied to a programmable divider 34 which divides the VCO output based on a channel control signal from the controller 29. The divider 34 provides the divided signal to a phase comparator 35 to which a reference signal is also provided from a reference oscillator 37 through a fixed divider 36. The phase comparator 35 compares the phases of the two input signals to produce a phase difference between them. A signal indicating the phase difference is passed through the low-pass filter (LPF) 38 to eliminate its higher frequency components. The output of LPF 38 and the modulation signal are applied to VCO 33 to control the output frequency thereof.

The output of VCO 33 is supplied as a transmission signal through a buffer amplifier 39 to a power amplifier 40. Power amplifier 40 amplifies the transmission signal up to a desired level and supplies the amplified signal to the antenna 11 through the duplexer 12 for radiation.

To change a frequency being used, the controller 29 changes the channel control signals which are provided to the synthesizer 17 and to the programmable divider 34. A hook switch 41 is connected to the controller 29 to detect whether or not the transceiver 1 is in a communication, or conversation, state. The communication state may be checked by seeing whether or not sufficient electric field is received.

The output of IF amplifier 22 is also supplied to a logarithmic amplifier 27 whose output signal is a logarithmic function of the input signal. The output signal of logarithmic amplifier 27 is supplied to an interference detector 28 which may be composed of a diode and a voltage comparator. If intermodulation distortion occurs in the output of first mixer 15, a beat appears on the output of logarithmic amplifier 27. If the interference detector 28 detects the beat, it produces a high-level signal, and otherwise it produces a low-level signal.

Upon the high-level signal, the controller 29 sets the gain of RF amplifier 13 to a minimum level. By this operation, the intermodulation distortion on the output of mixer 15 can be reduced or eliminated. Upon the on-hook of hook switch 41, i.e., the end of conversation, the controller 29 restores the gain of RF amplifier 13 to the maximum level, so that high reception sensitivity can be resumed.

Alternatively, the controller 29 checks the output of interference detector 28 at regular intervals during conversation, or communication. If the controller 29 receives a low-level signal indicating no interference it restores the gain of RF amplifier 13 to the maximum level.

Furthermore, if the high-level signal indicating the existence of interference still exists after the gain of RF amplifier 13 is set to a minimum level, the controller 29 may change a frequency being used for the transceiver 1 to another frequency. In this case, the controller 29 first transmits to a base station (not shown) data indicating that the transceiver 1 needs a new frequency. The base station sends back to the transceiver 1 data indicating a newly assigned frequency. Upon this data supplied from the audio circuit 25, the controller 29 changes the oscillation frequency of synthesizer 17 and the dividing ratio of programmable divider 34, so that the transceiver 1 is tuned to the newly assigned frequency.

In FIG. 2A, a high level indicates that there is interference wave(s) on a frequency used in the transceiver 1 which interference wave(s) would cause the mixer 15 to produce intermodulation distortion, as mentioned earlier. A low level indicates that there is no interference wave on the used frequency. In FIG. 2B, a high level indicates that the transceiver 1 is in a conversation condition which may be detected by the state of hook switch 41. A low-level in FIG. 2B shows no conversation. In FIG. 2C, if the interference detector 28 detects the beat, it produces a logical "1" signal. Otherwise, the detector 28 produces a logical "0" signal.

In response to the logical "1" signal, the controller 29 generates a low-level control signal to the RF amplifier 13 to minimize the gain thereof, so that the intermodulation distortion can be depressed or eliminated. Upon the end of conversation, the controller 29 generates a high-level control signal to maximize the gain of RF amplifier 13, so that the reception sensitivity is resumed to the maximum value.

Even though there is no interference during a period To, the reception sensitivity is still sacrificed. To avoid this sacrifice, after detecting the interference, the controller 29 periodically restores the gain of RF amplifier 13 to the maximum value for a short time $T_2$ (see FIGS. 3C and 3D). The interval of the periodic gain resumption is $T_1$, as shown in FIG. 3D. FIGS. 3A and 3B show the same situations as those of FIGS. 2A and 2B, respectively. As can be seen from FIGS. 3C and 3D, immediately after the detector 28 detects no interference, the controller 29 maximizes the RF amplifier gain at time t0, so that the reception sensitivity can be quickly regained.

Returning to FIG. 2C, assume the detector 28 detects the beat again at time t1 (see a broken line) even if the RF amplifies gain is minimized. In such a case, the controller 29 sends to a base station (not shown) data indicating that the transceiver 1 needs a new frequency, as discussed before. The base station will send back channel assignment data indicating a newly assigned frequency. Based on the sent-back data, the controller 29 changes the output frequency of synthesizer 17 and the dividing ratio of programmable divider 34. Thus, the transceiver 1 changes its channel (frequency) to the newly assigned channel (frequency) on which there would be no interference wave.

What is claimed is:

1. A radio transceiver comprising:
   radio frequency (RF) amplifier means for amplifying a radio signal;
   IF signal producing means for producing an intermediate frequency (IF) signal from the output of said RF amplifier means;
   interference detector means responsive to said IF signal for detecting interference at a first frequency used for said transceiver to produce an interference detection signal when there is interference and to produce a non-interference detection signal when there is no interference;
   means for detecting the end of conversation of radio telephone communication in the transceiver to produce a conversation end signal; and
   controller means including:
   (a) means for decreasing a gain of said RF amplifier means whenever said interference detection signal is produced;
   (b) means for periodically increasing said gain for a predetermined period of time after said gain is decreased; and
   (c) means for increasing said decreased gain in response to one of said conversation end signal and said non-interference detection signal.

2. The radio transceiver as claimed in claim 1, wherein said controller means further includes channel change means for changing said first frequency to a second frequency if said controller means receives said interference detection signal after said gain is decreased.

3. The radio transceiver as claimed in claim 2, wherein said channel change means comprises:
  means for sending to a base station data indicating that said transceiver needs a new frequency;
  means for receiving data indicating a second frequency; and
  changing means responsive to the received data for changing said first frequency to said second frequency.

4. The radio transceiver as claimed in claim 3, further comprising:
  synthesizer means for generating a first local oscillation signal to be mixed with said RF amplifier output in said IF signal producing means, said synthesizer means changing the frequency of said first local oscillation signal in response to a first channel control signal;
  VCO means for generating a transmission signal, said VCO means changing the frequency of said transmission signal in response to a VCO control signal;
  programmable divider means for frequency dividing said transmission signal to produce a divided signal, said divider means changing the dividing ratio thereof in response to a second channel control signal;
  reference oscillator means for generating a reference oscillation signal;
  phase comparator means for phase comparing said divided signal and said reference oscillation signal to produce a phase difference signal;
  means for providing said phase difference signal to said VCO means as said VCO control signal;
  means for transmitting said transmission signal, wherein said changing means comprises means for receiving a channel assignment signal; and
  means responsive to the received channel assignment signal for providing said first and second channel control signals to said synthesizer means and programmable divider means, respectively.

5. The radio transceiver as claimed in claim 1, wherein said interference detector means comprises:
  logarithmic amplifier means for logarithmically amplifying said IF signal to produce an amplified signal; and
  detector means responsive to said amplified signal for detecting a beat component, for producing said interference detection signal when detecting said beat component and for producing said non-interference detection signal when detecting no beat component.

6. The radio transceiver as claimed in claim 1, wherein said means for detecting the end of conversation comprises a hook switch and a means for providing said conversation end signal in response to an on-hook condition of said hook switch.

7. A radio transceiver comprising:
  RF amplifier means for amplifying an RF signal;
  first frequency converting means for frequency converting the amplified RF signal into a first IF signal;
  second frequency converting means for frequency converting said first IF signal into a second IF signal;
  interference detector means for detecting intermodulation distortion by determining whether a beat is included in said second IF signal;
  means for detecting an end of communication which is carried out by said transceiver; and
  controller means including:
  (a) means for decreasing a gain of said RF amplifier means whenever said interference detector means detects intermodulation distortion;
  (b) means for increasing the decreased gain of said RF amplifier means in response to the detection of said end of communication;
  (c) means for periodically increasing the decreased gain after said controller means detects said intermodulation distortion; and
  (d) means for maintaining the increased gain in response to no detection of said intermodulation distortion while said gain is increased by said means for periodically increasing.

8. The radio transceiver as claimed in claim 7, wherein said controller means further includes means for changing a frequency used for said transceiver to another frequency in response to the detection of said intermodulation distortion after said gain is decreased.

9. A method of reducing intermodulation distortion in a radio transceiver, comprising the following steps of:
  (a) amplifying a radio frequency (RF) signal;
  (b) producing an intermediate frequency (IF) signal from the amplified RF signal;
  (c) detecting interference at a first frequency used for said transceiver to produce an interference detection signal when there is interference and to produce a non-interference detection signal when there is no interference;
  (d) detecting the end of conversation of radio telephone communication in the transceiver to produce a conversation end signal;
  (e) decreasing a gain at said step (a) whenever said interference detection signal is produced;
  (f) periodically increasing said gain for a predetermined period of time after said gain is decreased;
  (g) increasing the decreased gain in response to one of said conversation end signal and said non-interference detection signal.

10. The method as claimed in claim 9, further comprising the following step of:
  (h) changing a first frequency used for said radio transceiver to a second frequency if said interference detection signal is produced after said gain is decreased.

11. A method of reducing intermodulation distortion in a radio transceiver, comprising the following steps of:
  (a) amplifying a first signal;
  (b) frequency converting the amplified first signal into a second signal;
  (c) detecting intermodulation distortion in said second signal to produce a distortion detection signal;
  (d) detecting an end of communication performed by said radio transceiver to produce an end signal;
  (e) decreasing a gain at said step (a) whenever said distortion detection signal is produced;
  (f) increasing the decreased gain in response to said end signal;
  (g) periodically increasing the decreased gain for a predetermined period of time after said gain is decreased at said step (e);
  (h) maintaining the increased gain in response to no detection of said intermodulation while said gain is increased by said step (g).

12. The method as claimed in claim 11, further comprising the following step of:
  (i) changing a first frequency used for said radio transceiver to a second frequency if said distortion detection signal is produced after said gain is decreased.

* * * * *